Dec. 5, 1950     C. F. THIELE     2,533,068
INDICATOR AND CONTROL DEVICE

Filed Feb. 28, 1947     3 Sheets-Sheet 1

Inventor
Charles F. Thiele
By Wooster & Davis Attorneys

Dec. 5, 1950 C. F. THIELE 2,533,068
INDICATOR AND CONTROL DEVICE
Filed Feb. 28, 1947 3 Sheets-Sheet 2

Inventor
Charles F. Thiele
By
Wooster & Davis Attorneys

Dec. 5, 1950            C. F. THIELE            2,533,068

INDICATOR AND CONTROL DEVICE

Filed Feb. 28, 1947                        3 Sheets-Sheet 3

Inventor
Charles F. Thiele
By Wooster & Davis
Attorneys

Patented Dec. 5, 1950

2,533,068

UNITED STATES PATENT OFFICE 2,533,068

INDICATOR AND CONTROL DEVICE

Charles F. Thiele, Old Greenwich, Conn.

Application February 28, 1947, Serial No. 731,449

11 Claims. (Cl. 318—325)

This invention relates to a limit indication and control device, and it relates more particularly to such a device whereby a pointer, disc, or other movable or turnable element operates in co-operation with the grid circuit of a vacuum tube to produce a signal which causes the operation of an audible or visible indicator or the operation of some device or apparatus, and it has as an object to provide such a limit indication and control device which functions positively and accurately under all conditions and where there is no pitting or burning of the contacts exercising the primary control.

In the usual control or signaling devices where battery and similar or usual control currents are used, the contacts quickly become so pitted the device does not work and it can never be relied on, as one never knows whether it is going to work or not. It is, therefore, a particular object of this invention to provide a control or signaling device in which the movable element responsive to changes or functions to be controlled or indicated operates with such a small current there is no pitting of the contacts whatever, so that they always maintain their clean normal condition and always function.

There are many instances when it is desirable to have control of a variable, such as speed, temperature, current, voltage, pressure, fluid flow, weight deflection, or the like, between certain predetermined limits; or it may be desirable to show an aural or visual indication whenever the variable exceeds or falls below certain limits. Usually any change in any condition, function or the like of any variable is shown on a dial type indicator where a pointer or turnable disc or other movable element, responsive to a change in the variable, indicates the change in the variable on a calibrated scale.

In order to provide a control, or a positive indication when the responsive element passes a certain limit or limits on the scale, it is desirable that the movable element actuate a limit control signal or signals which will cooperate with regulating means associated with the variable to maintain the variable between the predetermined limits, or to provide a visual or aural indication when such limits are exceeded. It is imperative that in providing this limit control signal or signals that the action be accurate and positive, and that when the limit or limits are reached, substantially no impediment or drag be offered to the indicator to impair its accuracy, and particularly that the device always functions when the limits are reached so that it can always be relied on to provide the protection and control when needed.

It is therefore an object of the invention to provide a control device whereby a pointer, disc, or other turnable or movable element which is responsive to or shifted because of a change in any condition or function or the like in a variable such as speed, temperature, current, voltage, pressure, fluid flow, weight deflections or the like, can control said variable between predetermined limits.

It is another object to provide a control device whereby a relatively delicate, low inertia turnable element, such as a pointer or disc on a dial instrument, may positively and accurately control the action of relatively high inertia devices such as motors, valves, and the like.

It is still another object to provide means whereby a pointer, disc or other turnable or movable element can cause and maintain a signal which can operate an audible or visible indicator, or cause the operation of a device or apparatus whenever said pointer, disc, or any turnable element reaches predetermined limits.

The above and other objects in view may be more readily understood by reference to the following detailed description and the accompanying drawings. It is to be understood, however, that the invention is not limited to the specific construction and arrangement shown, but may employ various changes and modifications as fall within the scope of the invention.

It is to be further understood that the term "limit control signal" as used hereinafter in the specification and claims is so called for convenience and refers to a signal produced by a change in current flow through a vacuum tube which may be used to actuate an indicating means. The term "indicating means" is used in the broad sense as meaning any one of a number of different devices, such, for example, as a visual indicator or an audible signal, selective means, or adjusting or control means and so forth, or any device affected or controlled by a limit determining signal.

Figure 1:
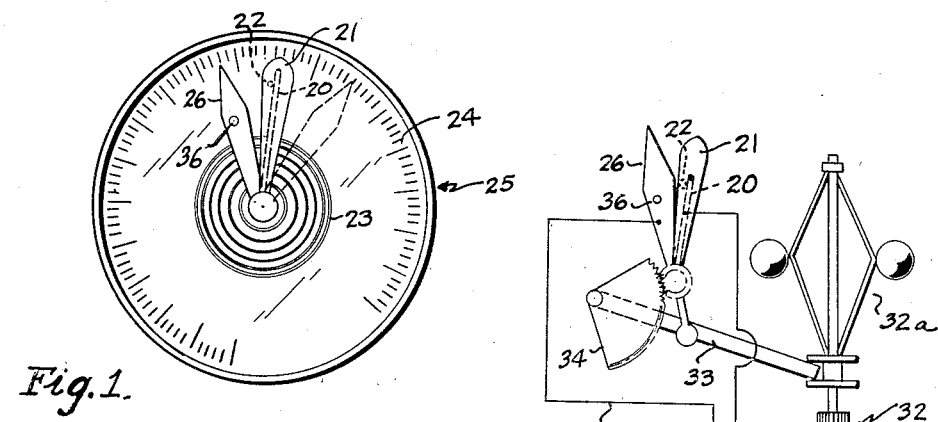
Fig. 1 is a plan view of a dial instrument showing a mode of operation wherein a movable pointer exercises control above and below a predetermined limit as determined by a positionable but stationary limit determining pointer.
Figure 2:
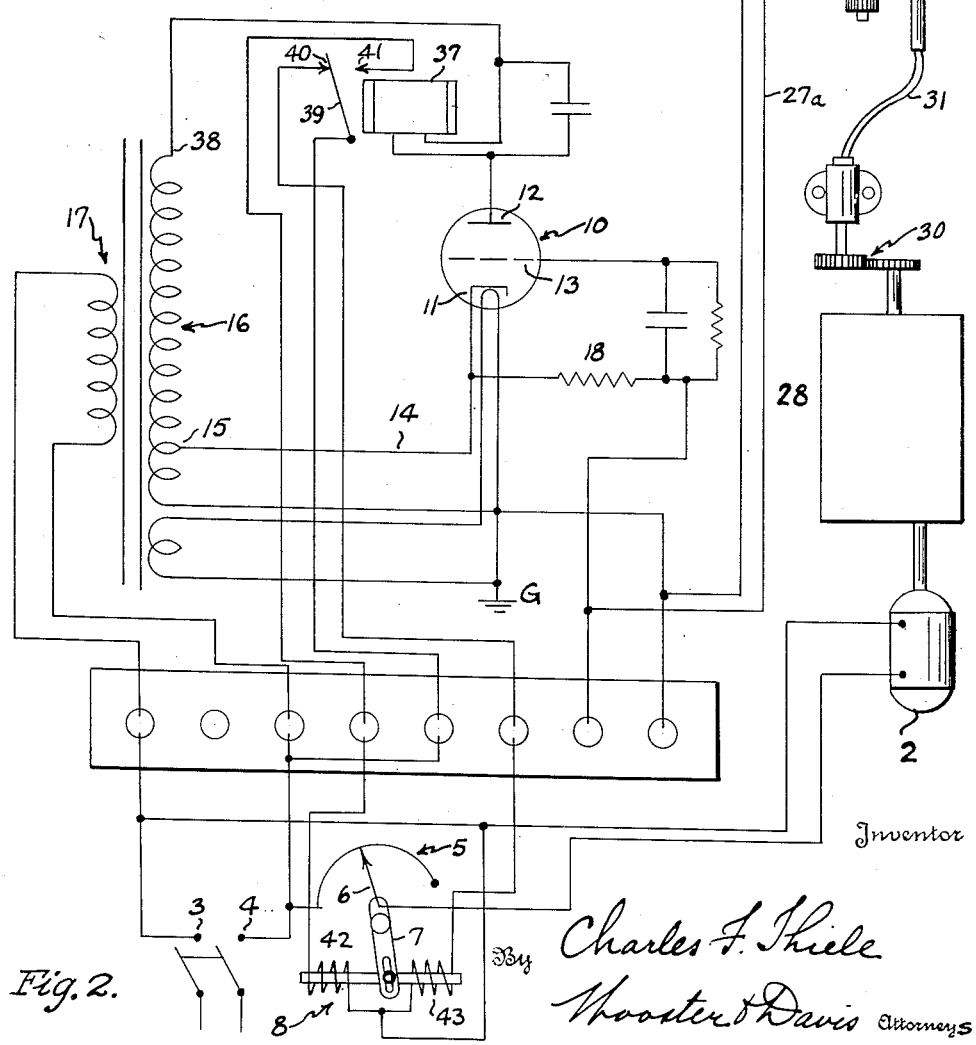
Fig. 2 is a schematic representation of one embodiment of the present invention applicable to the mode of operation represented in Fig. 1.

Referring now to Figs. 1 and 2, which show one embodiment of the present invention, wherein control is provided for motor 2 which is connected to a suitable source of power as represented by input terminals 3 and 4, said connection being through a regulator comprising rheostat 5 having adjustable arm 6, connected by linkage 7 to solenoid 8. The control device includes an amplifier comprising vacuum tube 10 having cathode 11, anode 12 and control grid 13. Cathode 11 is maintained at a potential above ground G by means of connection 14 to tap 15 on a secondary winding 16 of transformer 17. Cathode 11 is also connected through resistance 18 and conductor 27a to a movable contact 20 which is associated with limit determining pointer 21.

Movable contact 20 is held against stop 22 on pointer 21 by means of a hair spring 23. Limit determining pointer 21 is normally stationary, but can be positioned to any desired point on calibrated dial 24 of dial indicator 25. Stop 22 is carried by limit determining pointer 21, and as hair spring 23 normally holds movable contact 20 against stop 22, any positioning of limit determining pointer 21 causes said movable contact 20 to take a like position. The action of limit determining pointer 21 and movable contact 20 will be more fully understood as the description proceeds. However, the functional use of this limit determining pointer and its associated movable contact is to determine the point on the calibrated scale 24 of dial indicator 25 at which control is exercised.

Movable indicating pointer 26 is connected to ground G by means of connection 27. In the embodiment shown, movable pointer 26 is an element responsive to changes in the speed of motor 2. As indicated in the introductory outline of the invention above prior to the short descriptions of the figures of the drawings, it could be responsive to any variable to be controlled or indicated, such for example as speed, temperature, current voltage, pressure, fluid flow, weight deflection, or the like, the specific embodiment shown for indicating and controlling speed being used merely by way of example. The linkage between movable pointer 26 and motor 2 is by means of load 28, gearing 30, flexible shaft 31, gearing 32, and thence by means of linkage 33 operated by a speed responsive device 32a, such for example as centrifugal balls, which linkage 30 actuates cam 34, which is geared to movable pointer 26.

In the embodiment shown in Fig. 2, the control device is utilized to prevent the speed of motor 2 from exceeding a predetermined limit as determined by the setting of limit determining pointer 21 on calibrated scale 24 of dial indicator 25. It is to be understood, of course, that the control device may be used to control variables other than speed, and in its application motor 2 could be a pressure pump, an electric furnace, or any other device subject to control, the motor being used merely as an example.

The setting of limit determining pointer 21 at a predetermined point on calibrated scale 24 limits the speed of motor 2 in the following manner: as the speed of motor 2 increases it causes movable pointer 26, which is responsive to changes in the motor speed because of device 32a, to revolve about calibrated dial 24 in a clockwise manner. When motor 2 reaches a speed corresponding to that as determined by the setting of limit determining pointer 21 on calibrated dial 24, a projecting electrical contact 36 which is carried by movable arm 26, and electrically connected thereto, comes in contact with movable contact 20 closing circuit through leads 27 and 27a. As movable pointer 26 continues to revolve past limit determining pointer 21 in a clockwise direction, contact 36 remains engaged with movable contact 20 and removes said movable contact from its normal position against stop 22. At the instant contact 36 touches movable contact 20, cathode 11 of vacuum tube 10 is connected to ground through resistance 18, thereby causing a sudden increase in the current flow through vacuum tube 10 and producing a limit control signal in the anode circuit of said tube. Anode 12 of vacuum tube 10 is connected through relay 37 to a source of positive potential as indicated by tap 38 on secondary winding 16 of transformer 17. The limit control signal resulting from the sudden change in current through vacuum tube 10 caused by the grounding of cathode 11 through resistance 18, causes relay 37 to be energized, thereby drawing armature 39 away from contact 40 and causing said armature to make a connection with contact 41. As armature 39 is connected to input terminal 4, and as contact 41 is connected through winding 42 of solenoid 8 to the other power input terminal 3, this new connection energizes winding 42 of solenoid 8, thereby causing linkage 7 to operate movable arm 6 of rheostat 5 in a clockwise direction, thus putting more resistance in the circuit between input power terminals 3 and 4 and motor 2. This increased resistance causes the speed of motor 2 to decrease, or prevents further increase, and a resulting reversal in the direction of movement of movable pointer 26, or prevents further movement to the right. However, it is to be noted that with this arrangement, after contact 36 engages contact 20, should pointer 26 pass beyond pointer 21, it carries contact 20 with it, and this contact remains in engagement with contact 36 and, therefore, no matter how far pointer 26 moves beyond pointer 21 it carries contact 20 with it and maintains the circuit closed.

When the speed of motor 2 drops to a point where movable pointer 26 passes limit determining pointer 21 in a counter-clockwise direction, movable contact 20 is engaged and stopped by stop 22, thus disengaging movable contact 20 and contact 36 carried by movable pointer 26. The potential of the control circuit of vacuum tube 10 is again changed and cathode 11 is no longer connected to ground through resistance 18. The current through vacuum tube 10 thus decreases, producing a limit control signal in the anode circuit which causes relay 37 to release armature 39 from contact 41 and to again rest against contact 40. As contact 40 is connected through winding 43 of solenoid 8 to power input terminal 3, this connection energizes winding 43 of solenoid 8, thereby causing linkage 7 to operate movable arm 6 of rheostat 5 in a counter-clockwise direction. This decreases the resistance in the circuit between power input terminals 3 and 4 and motor 2, thereby causing the speed of motor 2 to increase.

It is thus readily apparent that the speed of motor 2 can be controlled at a given speed by the setting of limit determining pointer 21. It is also evident that the limit control signal produced in the anode circuit of vacuum tube 10 can be used to actuate a visible indicator such as a lamp, or an audible indicator such as, for example, a buzzer, or any desirable form of indicator or control device.

Figure 3:
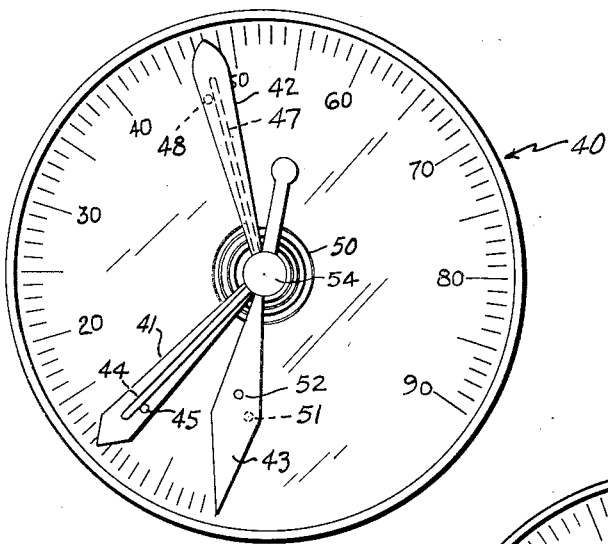
Fig. 3 is a plan view of a dial instrument showing mode of operation wherein a movable pointer exercises control above and below two predeterminable limits as determined by two positionable but stationary limit determining pointers. In the figure the movable pointer is at a position on the dial below the two predetermined limits.
Figure 4:
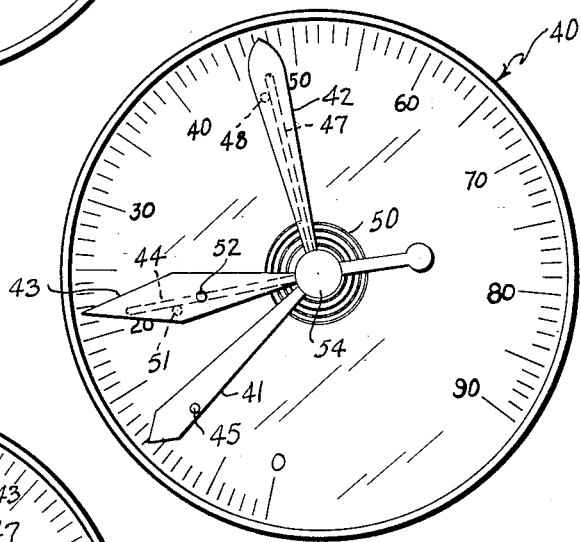
Fig. 4 is a plan view of the same instrument shown in Fig. 3, except that the movable pointer is at a position on the dial between the two predeterminable limits.
Figure 5:
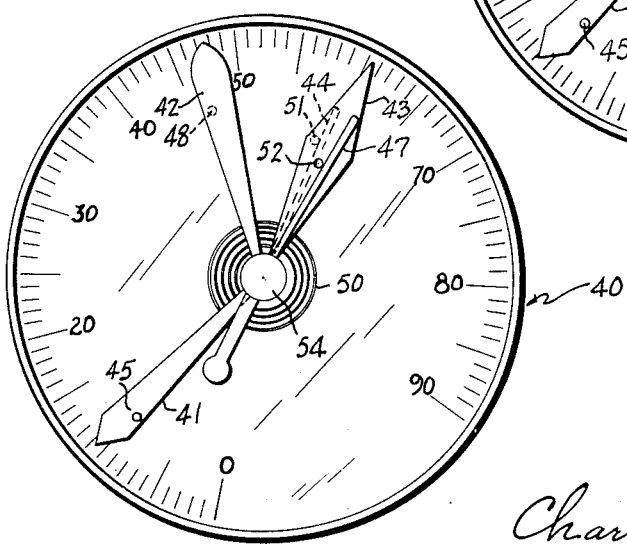
Fig. 5 is also a plan view of the same instrument shown in Fig. 3, except that the movable pointer is at a position on the dial above the two predeterminable limits.
Figure 6:
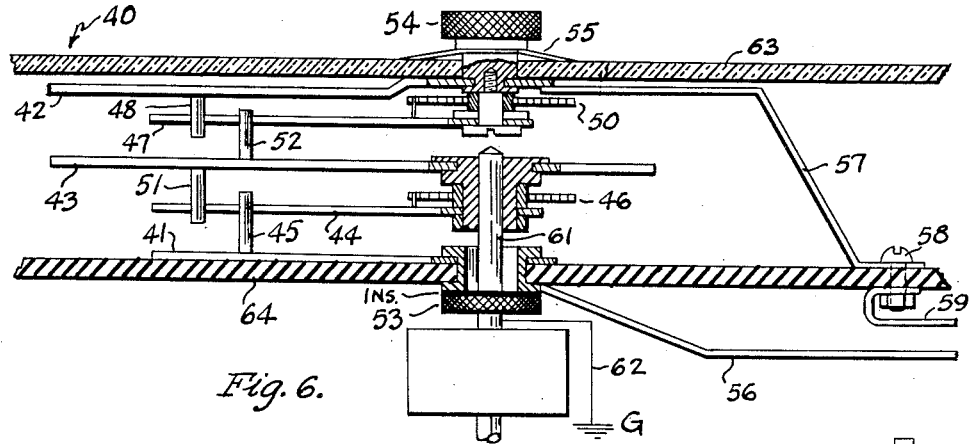
Fig. 6 is a sectional view of the dial instrument shown in plan view in Figs. 3, 4 and 5.

Referring now to the second embodiment of the present invention wherein control is exercised between two predeterminable limits, Figs. 3, 4 and 5 show a calibrated dial indicator 40 having a first positionable but stationary lower limit determining pointer 41, a second similar upper limit determining pointer 42, and a movable element 43, which is responsive to changes in a variable. Although the dial indicator herein shown is the same as dial indicator 25 in the embodiment of Fig. 1, with the addition of a lower limit determining pointer, different numbers are used in the description of the second embodiment for reasons of ease and clarity of description. Fig. 3 shows the movable element 43 at a point on the calibrated scale below the limits determined by the heretofore mentioned limit determining pointers 41 and 42. Fig. 4 shows the movable element 43 at a position between the two limit determining pointers 41 and 42, and Fig. 5 shows the movable element 43 at a point on the calibrated scale above the limit determined by the upper limit determining pointer 42. Fig. 6 shows an elevation view of the elements shown in plan view in Figs. 3, 4 and 5.

A first movable contact 44 is associated with limit determining pointer 41 and is held normally against stop 45 by hair spring 46 (Fig. 6), stop 45 being carried by limit determining pointer 41 and being movable therewith. A second movable contact 47 is associated with limit determining pointer 42 and is held normally against stop 48 by hair spring 50. Stop 48 is carried by limit determining pointer 42 and is movable therewith. A contact 51 is connected to movable pointer 43 and is adapted to engage with movable contact 44 as pointer 43 passes a point on the calibrated scale of indicator 40 where said point is determined by the position of limit determining pointer 41. A second contact 52 is also carried by movable pointer 43 and is adapted to engage with movable contact 47 as movable pointer 43 passes a point on the calibrated scale of indicator 40 where said point is determined by the position of limit determining pointer 42.

A knob 53 is associated with limit determining pointer 41, and insulated therefrom, and by turning said knob in a clockwise or counter-clockwise direction, limit determining pointer 41 and its associated movable contact 44 can be positioned at any predeterminable point on the calibrated scale of indicator 40. A second knob 54 is associated with limit determining pointer 42 and may likewise be turned in a clockwise or counter-clockwise direction to position limit determining pointer 42 and associated movable contact 47 at any point on the calibrated scale of indicator 40. A spring washer 55 is provided to maintain the position of limit determining pointer 42 after it has once been set by the positioning of knob 54.

Limit determining pointer 41 and stop 45 are electrically connected together and an electrical connection external to dial indicator 40 is provided therefor by connection 56. Similarly, stop 48 and limit determining pointer 42 are electrically connected and an external connection is provided therefor through the medium of connection 57, bolt 58, and external connection 59. Movable pointer 43 and movable contact 44 are mounted on a turnable post or shaft 61, which is electrically connected to ground G by means of connection 62. A lens 63 of glass or plastic, or other suitable material, is provided to enclose gauge 40. Bottom plate 64 is provided and may be made of any suitable insulating material on which a calibrated scale or any other suitable measuring means may be superimposed.

Figure 7:
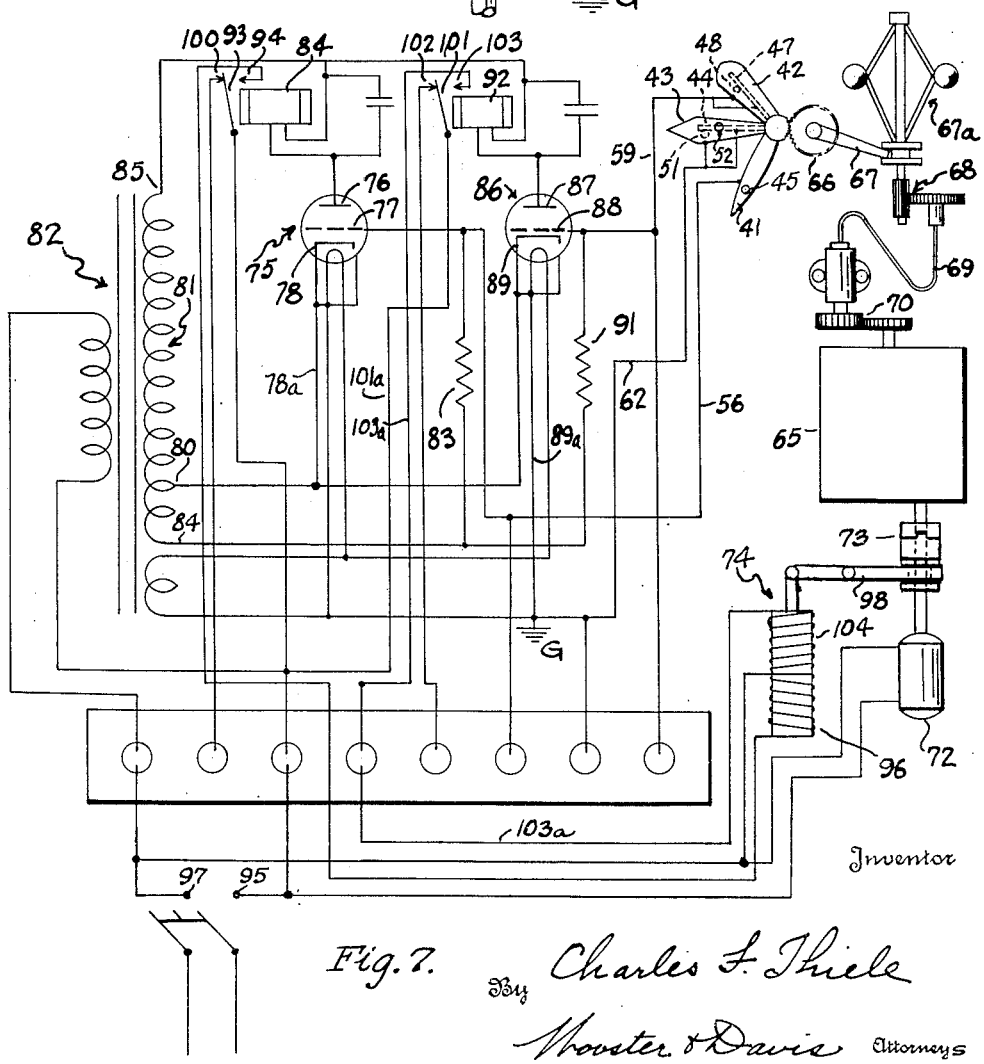
Fig. 7 is a schematic diagram of a second embodiment of the invention applicable to the mode of operation represented in Figs. 3, 4 and 5.

Fig. 7 shows a second embodiment of the present invention, and in the figure the dial indicator 40 and its limit determining pointers 41 and 42, movable pointer 43, and other parts are represented somewhat schematically. This schematic representation does not detract from the operation of the invention, but rather is introduced for ease of description.

In the embodiment shown, movable pointer 43 is responsive to or shifted by a change in variable load 65 which is coupled to movable pointer 43 by means of gear 66, linkage 67 operated by speed responsive device 67a, gearing 68, flexible shaft 69 and gearing 70. Variable load 65, which by way of example might be a pressure pump or any other machine or mechanism to be controlled, is driven by motor 72 through the medium of clutch 73. Although in the present embodiment control is exercised by clutch 73 in cooperation with solenoid 74 as hereinafter described, it is to be clearly understood that it is used merely by way of example and that the invention is not limited to the use of a motor, or clutch, or any other specific means, but rather can be used to provide any sort of indication when a certain limit or limits are reached, whether said indication be in the form of regulation of any variable which is subject to control, or whether it be a visible or audible indication. Thus the embodiment herein shown wherein a motor and clutch are utilized as indicating means, merely typifies one mode of operation.

A first amplifier including vacuum tube 75, which has an anode 76, a control grid 77, and a cathode 78, is associated with limit determining pointer 41. Cathode 78 is connected to tap 80 on a secondary winding 81 of transformer 82. Tap 80 and cathode 78 are connected by conductor 78a to ground G. Control grid 77 is connected through resistance 83 to tap 84 of winding 81, said tap being at a potential below ground. Control grid 77 is also electrically connected by means of connection 56 to limit determining pointer 41. Anode 76 of vacuum tube 75 is connected through relay 84 to a source of positive potential represented by tap 85 on secondary winding 81.

A second amplifier including vacuum tube 86, having anode 87, control grid 88, and cathode 89, is associated with limit determining pointer 42. Cathode 89 is connected through connection 89a to ground G and control grid 88 is connected through resistance 91 to a source of negative potential as represented by tap 84 on secondary winding 81. Control grid 88 is also connected by means of connection 59 to limit determining pointer 42 and movable contact 47. Anode 87 of vacuum tube 86 is connected through relay 92 to a source of positive potential 85 on secondary winding 81.

The operation of the control device may best be understood by following the action of the device as movable pointer 43 attains different positions on the calibrated scale of indicator 40.

When movable pointer 43 is at a position as shown in Fig. 3 below lower limit pointer 41, movable contact 44 is resting against stop 45, which is in electrical contact with limit determining pointer 41. As movable contact 44 is always connected to ground through post 61 and connection 62, control grid 77 is therefore connected to ground whenever movable contact 44 is resting against stop 45. Under this condition, vacuum tube 75 is conducting and the current flowing through its anode circuit is sufficient to operate relay 84 and draw armature 93 against contact 94. As armature 93 is connected to power input terminal 95 which is one side of a source of electrical energy, and as contact 94 is connected through winding 96 of solenoid 74 to input terminal 97, which is the other side of source of electrical energy, the circuit through winding 96 is completed. This causes solenoid 74 to operate and throw in clutch 73 by means of linkage 98. Motor 72 is thence engaged with variable load 65, and movable pointer 43, which in the present embodiment is responsive to changes in variable load 65, moves and passes over limit determining element 41. As this happens, stop 51 engages movable contact 44, thereby removing said movable contact from its normal resting position against stop 45 and disconnects control grid 77 of vacuum tube 75 from ground. This decreases the flow of current through vacuum tube 75 to produce a limit control signal which causes armature 93 to come in contact with contact 100, which is open circuited. Clutch 73 remains in, however, as it requires a positive action of solenoid 74 to throw this clutch in or out.

The movable pointer 43 is now at an intermediate position between lower pointer 41 and upper pointer 42, as indicated in Figs. 4 and 7, and in this position control grid 88 of vacuum tube 86 is connected through resistance 91 to a source of negative potential 84. Under this condition the current flow through vacuum tube 86 is not sufficient to cause the operation of relay 92 and armature 101 rests against contact 102, which is open circuited. As movable pointer 43 passes over limit determining pointer 42, contact 52 engages movable contact 47, thereby causing said movable contact to be connected to ground through connection 62. This causes the current through vacuum tube 86 to increase, thereby producing a limit control signal which causes relay 92 to operate, drawing armature 101 into connection with contact 103. Contact 103 is connected by 103a through winding 104 of solenoid 74 to point 97, which is one side of a source of electrical energy. As armature 101 is connected to point 95 through 101a, which is the other side of the source of electrical energy, winding 104 is energized and solenoid 74 operates through linkage 98 to throw clutch 73 out, thereby disengaging motor 72. Clutch 73 remains out until the variable load drops to a limit determined by the setting of limit determining pointer 41. As the pointer drops below this limit the heretofore mentioned solenoid winding 96 is again energized and the above described cycle is repeated.

In view of the foregoing it is evident that the limit control device as herein described has many uses and advantages. First of all, it is accurate and positive acting, due primarily to the fact that the potential difference and current between the movable pointer and the limit determining pointers may be kept at a very low value. The current is so low (of the order of three micro-amperes) as to prevent any pitting or burning of the contacts when the movable pointer makes or breaks the electrical connections in the grid circuits of the vacuum tubes. As these contacts exercise the primary control, it is evident that the absence of any pitting or burning insures a positive action at all times, and the device may be depended upon to function indefinitely. Furthermore, as there is such a low current across these contacts the movable pointer, movable contacts, limit determining pointers, and in fact all elements may be of a light weight construction. In consequence, the movable contacts normally held in place by the hair springs can be of such a light weight that they offer virtually no impediment or drag to the movable pointer. This is of great importance in that the accuracy of the indication given by the movable pointer is in no way impaired by the positioning of the limit determining pointers.

Another advantage of this light construction is that the limit determining pointers may be set close to one another, thereby allowing control between small limits. Attention is also directed to the fact that once electrical contact is made between the movable pointer and the movable contact this contact is maintained until the movable pointer drops below the limit determined by the particular limit determining pointer associated with the movable contact. Thus, as pointer 43 moves above or beyond pointer 41, it carries contact 44 with it, and, therefore, keeps contact 44 separated from contact 45 as long as the pointer 43 is above pointer 41. Similarly, as pointer 43 passes above or beyond 42, contact 52 carries contact 47 with it, and therefore maintains contact 47 in engagement with contact 52 so long as pointer 43 is above the pointer 42, and maintains the circuit.

It will also be evident to one skilled in the art that the invention as herein described is subject to modifications and changes without departing from the spirit and scope of the invention as described in the specification and claims. For example, although two embodiments have been shown, one using a single limit determining pointer and a second using two limit determining pointers, it is apparent that a plurality of limit determining pointers may be used depending upon the particular application of the control device.

Having thus described and set forth the nature of my invention, I claim:

1. A control device of the character described comprising a movable member, means responsive to a variable for shifting said member, a normally stationary member including a stop means, a movable contact, resilient means for retaining said contact against the stop means, a contact stop on the movable member adapted to engage the movable contact and shift it away from the first stop while maintaining contact between the contact stop and the movable contact as the movable member passes by the stationary member, and means for connecting an electric circuit with the movable member and movable contact to be controlled thereby.

2. A control device of the character described comprising a movable member, means responsive to a variable for shifting said member, a normally stationary member including a stop means, a movable contact, resilient means for retaining said contact against the stop means, a contact stop on the movable member adapted to engage the movable contact to shift it away from the first stop as the movable member passes by the stationary member, and an electric circuit connected with the movable member and movable contact to be controlled thereby.

3. A control device of the character described comprising a movable member, means responsive to a variable for shifting said member, a normally stationary member including a stop means, a movable contact, resilient means for retaining said contact against the stop means, an electric circuit connected to the movable contact and the movable member, and a contact stop on the movable member adapted to engage the movable contact to close the circuit and to shift the contact away from the first stop as the movable member passes by the stationary member to maintain the circuit as long as the movable member is positioned past the stationary member.

4. An indication and control device of the character described comprising a movable pointer, an upper limit pointer, a stop carried by the latter pointer, a movable contact, spring means for retaining the contact normally against the stop, a contact stop carried by the movable pointer adapted to engage the movable contact and shift it away from the first stop as the first pointer moves past the second pointer, and an electric circuit connected to the movable contact and the movable pointer to be controlled thereby.

5. An indication and control device of the character described comprising a movable pointer, an upper limit pointer, a stop carried by the latter pointer, a movable contact, spring means for retaining the contact normally against the stop, an electric circuit connected to the movable contact and the movable pointer, and a contact stop carried by the movable pointer adapted to engage the movable contact and shift it away from the first stop as the first pointer moves past the second pointer and carry the movable contact with the first pointer and in engagement with the contact stop thereon as long as the first pointer is positioned beyond the second pointer.

6. A control device of the character described comprising a movable member, means responsive to a variable for shifting said member, upper and lower limit control members, a stop on each of the latter members, a movable contact associated with each of the upper and lower control members, resilient means for retaining each movable contact normally against the stop on its respective control member, stops on the movable member arranged to engage the respective movable contacts as this member moves by the respective limit control members, and electric circuits connected with the movable contacts and the movable member for control thereby.

7. An indicator and control device of the character described comprising a movable pointer, means responsive to a variable condition, function and the like to shift said pointer, normally stationary upper and lower limit control pointers, a stop on each of the latter pointers, a movable contact associated with each of the upper and lower limit control pointers, a spring normally retaining each contact against the stop on its associated pointer, electric circuit leads connected to the respective movable pointer and the movable contacts, and stops on the movable pointer arranged to engage the respective movable contacts as this pointer moves past the respective stationary pointers and carry the movable contacts with it to control the circuits and maintain the conditions therein created by coaction of the movable pointer with the contacts.

8. An indicator and control device of the character described comprising a movable pointer, means responsive to a variable condition, function and the like to shift said pointer, normally stationary upper and lower limit control pointers, a stop on each of the latter pointers, a movable contact associated with each of the upper and lower limit control pointers, a spring normally retaining each contact against the stop on its associated pointer, a plurality of electric circuits connected with the movable pointer and said contacts, and stops on the movable pointer arranged to engage the respective movable contacts as this pointer moves past the respective stationary pointers and cooperate therewith to change the current in the corresponding circuits, said stops also arranged to carry the movable contacts with the movable pointer to maintain the circuit conditions created by coaction of the movable pointer with the contacts.

9. A device adapted to control a variable between predetermined limits, said device including a first positionable but stationary limit determining element, an electrical contact carried by said first limit determining element, a first movable contact, means for normally holding said first movable contact against the contact carried by said first limit determining element, a second positionable but stationary limit determining element, an electrical contact carried by said second limit determining element, a second movable contact, means for normally holding said second movable contact against the contact carried by said second limit determining element, a movable element responsive to a change in the variable, said movable element carrying at least one contact movable therewith, the contact carried by the movable element being adapted to engage with and remain engaged with said first movable contact as said movable element passes said first limit determining element in one direction and to disengage and remain disengaged with said first movable contact as it passes in the opposite direction, the contact carried by said movable element being adapted to engage with and remain engaged with said second movable contact as said movable element passes said second limit determining element in one direction and to disengage and remain disengaged with said second movable contact as it passes in the opposite direction.

10. A limit control device adapted to control a variable between predetermined limits, said device including a first positionable but stationary limit determining means including an electrical contact, a second positionable but stationary limit determining means including a second electrical contact, a movable element responsive to changes in said variable, said movable element being adapted to electrically contact and remain in contact with said first limit determining means as said movable element passes and is located beyond said first electrical contact in one direction, and to electrically disconnect and remain disconnected with said first contact as it passes and is located beyond said first limit determining means in the opposite direction, said movable element being also adapted to electrically contact and remain in contact with said second electrical contact as said movable element passes and is located beyond said second limit determining means in one direction and to electrically disconnect and remain disconnected with said second electrical contact as it passes and is located beyond said second limit determining means in the opposite direction, and means whereby said positionable means and contacts may be connected in electric control circuits.

11. A limit control device comprising a movable element responsive to changes in a variable, means for connecting said element in an electrical circuit, a normally stationary limit determining element including an electrical contact, said movable element being adapted to electrically contact said electrical contact and remain contacted with said contact as it passes and is located beyond, in one direction, a limit predetermined by said limit determining element, and to electrically disconnect and remain disconnected with said electrical contact as it passes and is located beyond, in a direction opposite to the first direction, the limit determined by the limit determining element, and said electrical connection and disconnection being adapted for causing signals to be transmitted.

CHARLES F. THIELE.

REFERENCES CITED

The following references are of record in the file of this patent:

UNITED STATES PATENTS

| Number | Name | Date |
|---|---|---|
| 1,446,656 | Pardee | Feb. 27, 1923 |
| 1,719,492 | Stoller | July 2, 1929 |
| 1,819,439 | Peterson | Aug. 18, 1931 |
| 1,881,150 | Trapp | Oct. 4, 1932 |
| 1,916,737 | Midworth | July 4, 1933 |
| 1,970,442 | Wittkuhns | Aug. 14, 1934 |
| 2,202,197 | Ewertz | May 28, 1940 |
| 2,246,905 | Uehling | June 24, 1941 |
| 2,261,495 | Ewertz | Nov. 4, 1941 |